(12) United States Patent
Hawkins, III

(10) Patent No.: US 9,101,835 B2
(45) Date of Patent: Aug. 11, 2015

(54) NETWORKED COMPUTER GAME SYSTEM AND METHODS WITH DIGITAL TOKENS

(75) Inventor: William M. Hawkins, III, San Mateo, CA (US)

(73) Assignee: KABAM, INC., San Francisco, CA (US)

(*) Notice: Subject to any disclaimer, the term of this patent is extended or adjusted under 35 U.S.C. 154(b) by 0 days.

(21) Appl. No.: 13/072,266

(22) Filed: Mar. 25, 2011

(65) Prior Publication Data

US 2011/0237325 A1    Sep. 29, 2011

Related U.S. Application Data

(60) Provisional application No. 61/317,487, filed on Mar. 25, 2010, provisional application No. 61/318,121, filed on Mar. 26, 2010.

(51) Int. Cl.
*G06F 21/00* (2013.01)
*A63F 13/30* (2014.01)
*G06F 21/62* (2013.01)

(52) U.S. Cl.
CPC .............. *A63F 13/12* (2013.01); *G06F 21/629* (2013.01); *A63F 2300/5586* (2013.01); *A63F 2300/609* (2013.01); *G06F 2221/2109* (2013.01); *G06F 2221/2149* (2013.01); *G06F 2221/2153* (2013.01)

(58) Field of Classification Search
CPC ....................................................... G06F 21/10
See application file for complete search history.

(56) References Cited

U.S. PATENT DOCUMENTS

| 6,009,458 | A |  | 12/1999 | Hawkins et al. |
| 6,398,651 | B1 | * | 6/2002 | Yamada ........................... 463/43 |
| RE37,957 | E | * | 1/2003 | Garfield ......................... 273/308 |
| 2002/0040929 | A1 | * | 4/2002 | Bramucci ...................... 235/435 |
| 2005/0079909 | A1 | * | 4/2005 | Singhaseni ...................... 463/22 |
| 2005/0093240 | A1 | * | 5/2005 | Jones et al. .................... 273/292 |
| 2005/0189716 | A1 | * | 9/2005 | Yu .................................. 273/292 |
| 2007/0202952 | A1 |  | 8/2007 | Francis et al. |
| 2009/0247305 | A1 | * | 10/2009 | Kanekal .......................... 463/43 |

FOREIGN PATENT DOCUMENTS

GB          2236421 A   *   4/1991   ............... A63F 9/22

OTHER PUBLICATIONS

The Search/Examination report corresponding to the PCT/US2011/030000 application.

* cited by examiner

*Primary Examiner* — James A Reagan

(57) ABSTRACT

Systems and methods for providing online games, including trading card games played on a computer, and other mobile devices, are described using combinations of standard and non-standard digital tokens. The systems and methods provide the capability for games to allow users to acquire rights to digital tokens that have different functionality across a spectrum of computer-implemented games, and for computer-implemented games to combine variable-use digital tokens with other standard gaming tools and constructs, such as a standard 52 card deck.

21 Claims, 6 Drawing Sheets

NETWORKED COMPUTER GAME SYSTEM AND METHODS WITH DIGITAL TOKENS

RELATED APPLICATIONS

The present application claims priority to U.S. Provisional Application No. 61/318,121, entitled Networked Computer Game Systems and Methods With Social Network Functions, filed Mar. 26, 2010, and U.S. Provisional Application No. 61/317,487, entitled Networked Computer Game System and Methods With Digital Tokens, filed Mar. 25, 2010, the contents of which are hereby incorporated by reference herein in their entireties.

BACKGROUND OF THE INVENTION

The present invention relates to systems and methods for providing online games, including trading card games played on a computer, and other mobile devices. Disclosed embodiments may find particular applicability with games that allow user to acquire rights to digital tokens that have different functionality across a spectrum of computer-implemented games, and with computer-implemented games that combine variable-use digital tokens with other standard gaming tools and constructs, such as a standard 52 card deck.

In most games that use tokens, such as trading cards, the tokens are limited to a set of functions defined by a single game. An exception to this would be U.S. Pat. No. 6,009,458, which describes a system including "persistent playing object" that may use generic attributes of an object to map to game-specific attributes.

Most card games involve the use of a standard deck, such as a standard 52 card deck. Some variations of a standard 52 card deck involve having a wild Joker, or other wildcards, that can become other cards. Typically, other card games that don't use a standard 52 card deck, such as trading card games, have an established variety of different card types, which may be provided by a game manufacturer. For example, U.S. Pat. No. RE37,957 provides a game with energy and effect cards. The effect (spell) cards specify what the card will do, while the energy (mana) cards are required to give power, with enough energy cards, to be able to use the effect card.

It would be desirable to have a new card game that builds on the familiarity of the standard 52 card deck, and includes expanded functionality and user participation through the use of digital tokens with unique features and cross-platform applicability, that may be, for example, assigned to individual users.

BRIEF SUMMARY OF THE INVENTION

Disclosed systems and methods may include various means of providing a computer-implemented game that use standard and non-standard tokens. Examples of standard tokens may include tokens associated with each card of a standard 52 card deck, and the like. Non-standard tokens may represent digital tokens with specified attributes and associated digital rights management for use by specified users, such as users purchasing rights to a particular non-standard token. Non-standard tokens may also include tokens with different functionality across a number of different computer-implemented games. Embodiments may include providing a user with a standard token from a first set of tokens. The first set of tokens may be shared and identical between a plurality of users playing the game, such as a set of standard tokens representing, at least initially, each card of a standard 52 card deck.

Rights of a user to non-standard tokens from a second set of tokens may be verified by automated processes including, for example, accessing a database by a computer processor to review digital rights stored in the database. Users may be provided at least one non-standard token from the second set of tokens based on the automated verification. In embodiments, users may be provided a limited set of non-standard tokens in the event that they have no specific rights to the non-standard tokens, e.g. users may be provided an "introductory" set of non-standard tokens with which to play a game, rather than non-standard tokens to which they have specific rights. In embodiments, computer-implemented games described herein may be provided in coordination with and/or via a social networking site.

Embodiments may include receiving over an electronic network a first instruction from the user to use a non-standard token during a game. Based on the first instruction, a second instruction may be executed, e.g. by a computer processor, that modifies an attribute of at least one standard token that has been provided to one of the users playing the game and/or a non-standard token provided to one of the users playing the game.

Embodiments may include similar second instructions that, for example, change possession of a standard token among the plurality of users playing the game, change possession of a non-standard token among the plurality of users playing the game, remove a standard token from play in the game, remove a non-standard token from play in the game, add a bonus score to a user, deduct a score from a user, prevent the use of a non-standard token, change a suit of a standard token provided to one of the users playing the game, and/or change a value of a standard token provided to one of the users playing the game.

In embodiments, the first set of tokens may consist of, at least initially, a pool of possible tokens corresponding to each card of a standard 52 card deck. In the context of computer-implemented methods, the present existence of tokens corresponding to each possible token is not necessarily required, as long as programming instructions that control the generation of such tokens, as needed, are provided in a way that limit the available pool as required.

In embodiments, the second instruction may modify an attribute of a standard token provided to one of the users, such as, for example, a numerical value and/or suit associated with a card of a standard 52 card deck.

Embodiments may include providing a first display to the user. A first provided standard token may be displayed in an up configuration that allows the user to view a suit and a value of the first token. A second provided standard token may be displayed in a down configuration that prevents the user from viewing a suit and a value of the second token. Based on a use of a non-standard token, a first display may be changed to include an additional indicator indicating that one of the users playing the game, other than the owner of the second token, can view at least one of the suit and the value of the second token in the down configuration. In embodiments, a visual indicator added to the display may be based on a logical rule including an applicability of a used non-standard token and an attribute of a standard token that the non-standard token was used against.

Embodiments may include calculating one or more user scores based on attributes of the standard and non-standard tokens, including modified attribute of the tokens, and determining a winner of the game based on the calculated user scores. User profiles may be updated in a database to reflect the results of the game, including, for example, modifying in the database a score representing a player's skill and the like.

Such scores can then be used later to perform other automated tasks such as matching players by skill, and the like.

Embodiments may include applying different rules in different games based on the use of the same non-standard token. For example, a particular non-standard token may be operable to perform a first set of functions in a first game, and operable to perform a different second set of functions in a second game. The non-standard token may also have different visual features in the different games.

Further advantages of the present subject matter will become apparent to those of ordinary skill in the art upon reading and understanding the following detailed description of the preferred embodiments.

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein.

Figure 1:
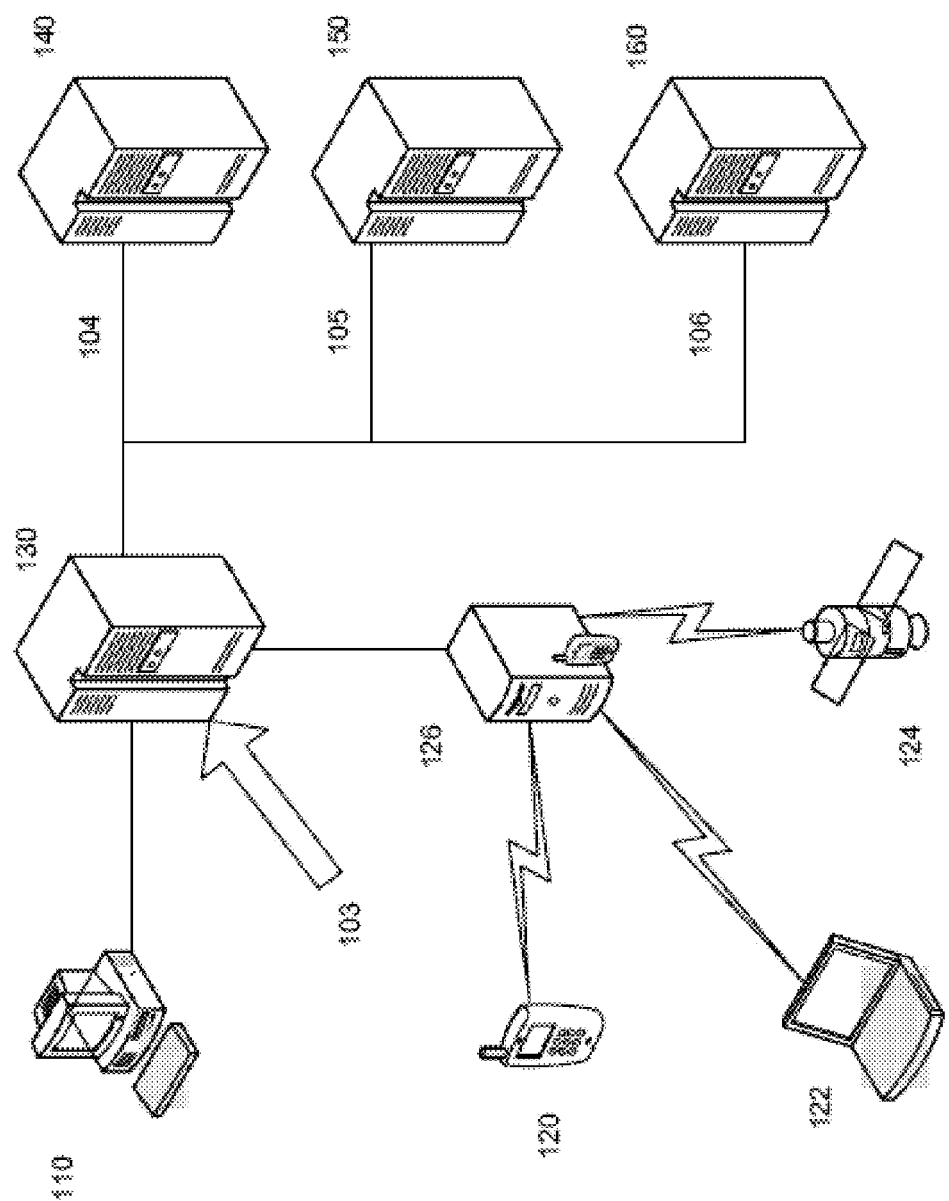
FIG. 1 depicts an exemplary system and related network in accordance with an embodiment of the present invention.

As indicated above, embodiments of the present invention may involve operations on a network, such as the Internet environment depicted in FIG. 1. A client computing device 110 may interact with various servers, 130, 140, 150, 160, and/or other computing and mobile devices 120, 122, to participate in a computer-implemented game. Information 103 may be exchanged through, and/or among, any of the nodes on the network, including transmissions through alternative networks such as various WLAN, cellular and/or satellite communication networks between intermediate server(s) 126 and remote devices such as handheld device 120, mobile computing device 122 and satellite network devices 124. One or more servers 140, 150, 160 may act alone or in combination with other servers and/or databases to present customized gaming interfaces, and gameplay, to participating users. For example, a server 140 may act as a game host for a particular Internet-based game (e.g. "game 1"), and access a common database maintained by server 150 with user information related to, for example, rights to digital tokens for use in game 1 and other games. As known by those of skill in the art, such games may also be supported by client-side applications that may provide, for example, user interfaces, customized displays, independent access to databases including user information, and the like.

For ease of explanation, a particular online card game, including a standard 52 card deck ("playing cards") and a set of non-standard tokens, referred to as "Noble" cards, is described. Other games and implementations are, of course, contemplated within the scope of the disclosure. In this embodiment, the system is configured to allow cards from the standard 52 card deck to be played, with cards from another, Noble, deck being used to modify the play. The system is configured to allow the Nobles to modify card play in a number of manners. In general, and as described further below, the Nobles may include "traps" that block moves by an opponent, "enhancers" that enhance the value of cards in a player's deck, "swaps" that allow a player to exchange card(s) with an opponent's card(s), and "increment/decrement" cards which allow incrementing or decrementing a player's or opponent's cards.

Figure 2:
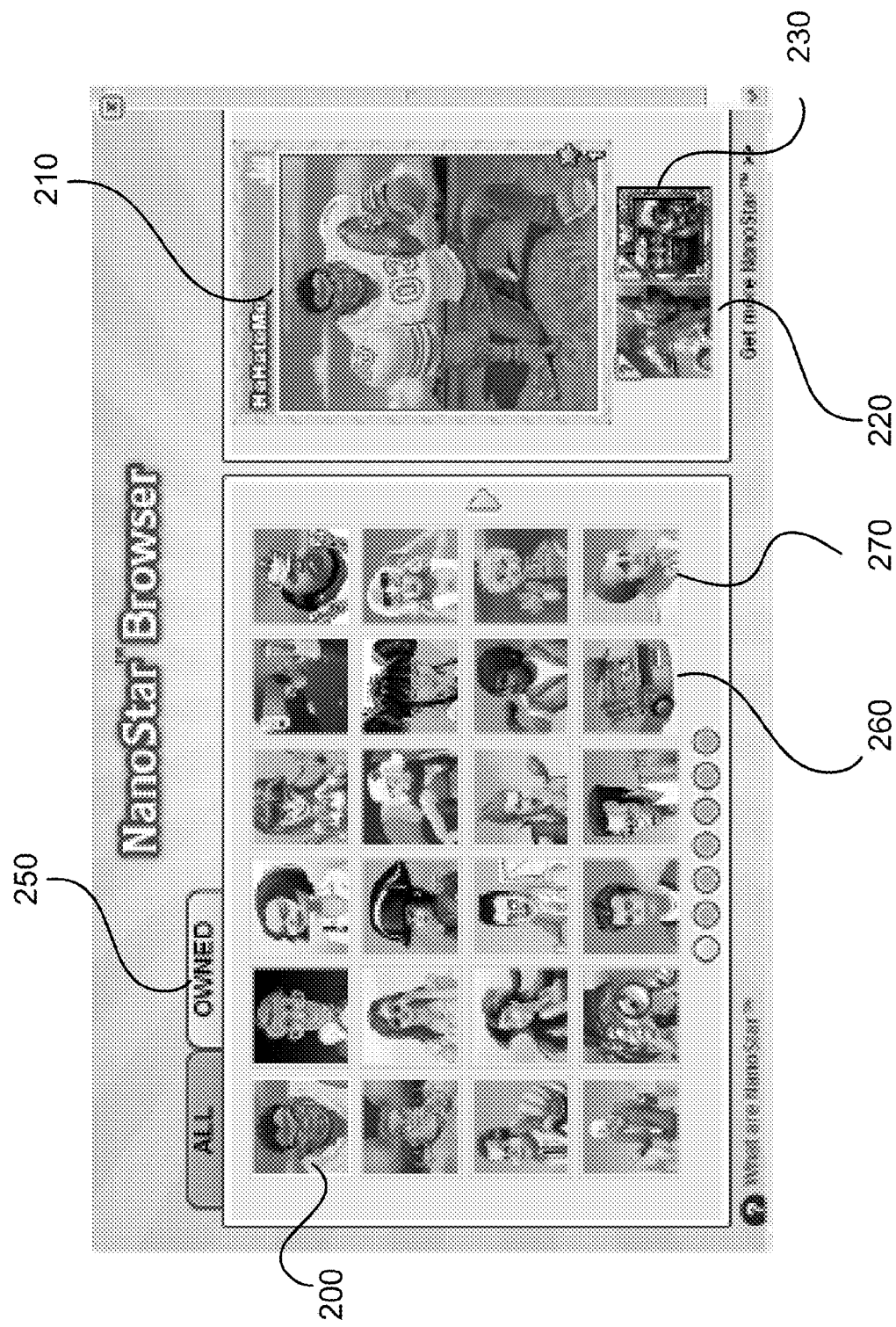
FIG. 2 depicts a display representing aspects of exemplary digital tokens in accordance with an embodiment of the present invention.
Figure 6:
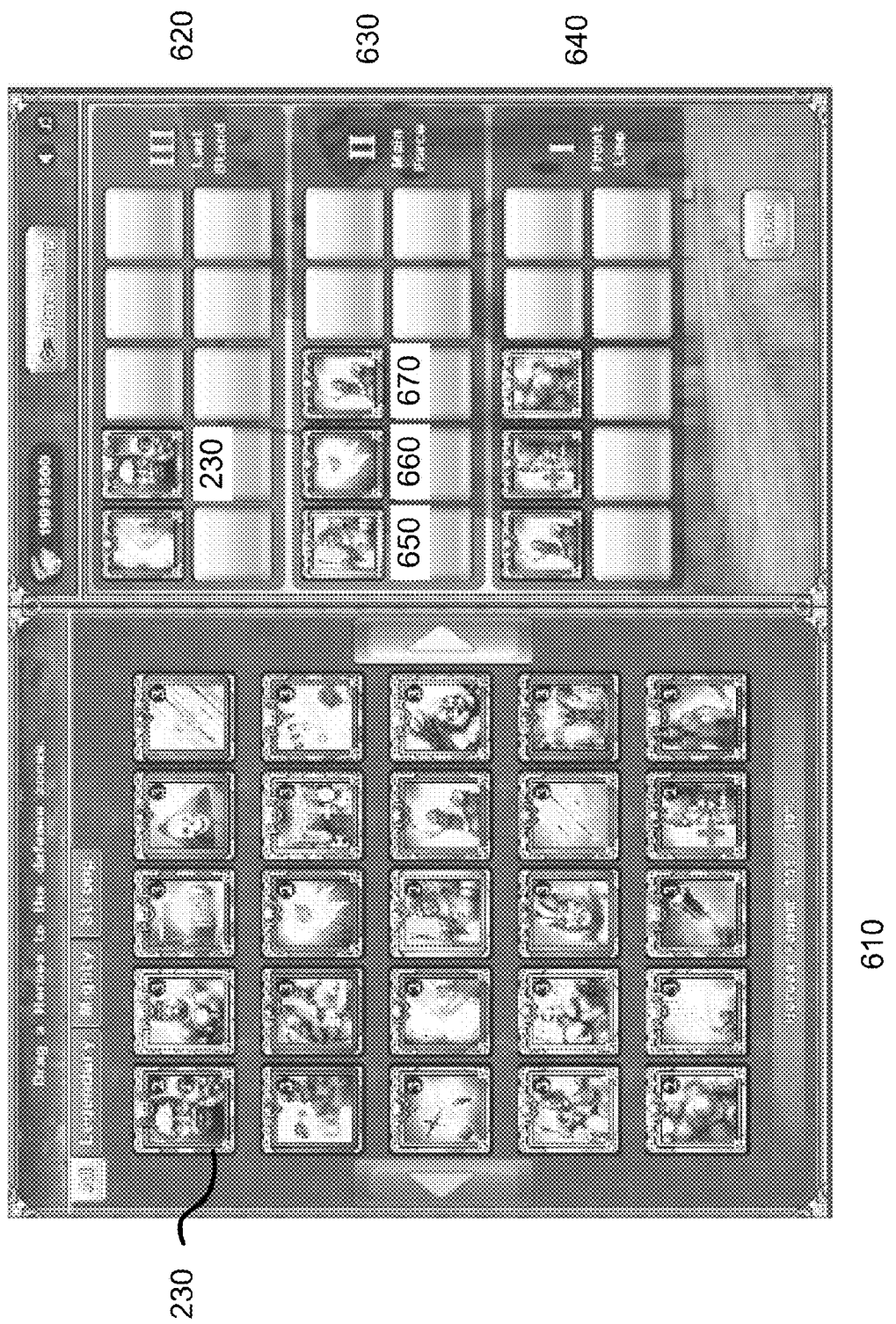
FIG. 6 depicts an exemplary user-side display of a selection screen for a game in accordance with an embodiment of the present invention.

Aspects of an exemplary assortment of non-standard tokens, are depicted in FIG. 2. As shown in FIG. 2, a digital token 200 may have a visual representation 210 for purposes of purchasing the token and displaying the token outside of particular gameplay, and may have additional visual representations 220, 230 for use in particular games. A user may be able to view a "deck" 250 of the tokens they have rights to or have assembled for particular uses, and store designated decks locally, or through the token management, and/or game, database servers. For example, as shown in FIG. 6, a user may select from their available tokens 610, on the right, to assign them to a particular deck, or functional group 620, 630, 640, on the right, before or during a game. The graphical display shown in FIG. 6 may have a game-specific graphic for a token, such as the tokens 650, 660, 670 shown on the right side of FIG. 2. As discussed further below, the tokens may have different functionality assigned, depending on the game it is used in.

Figure 3:
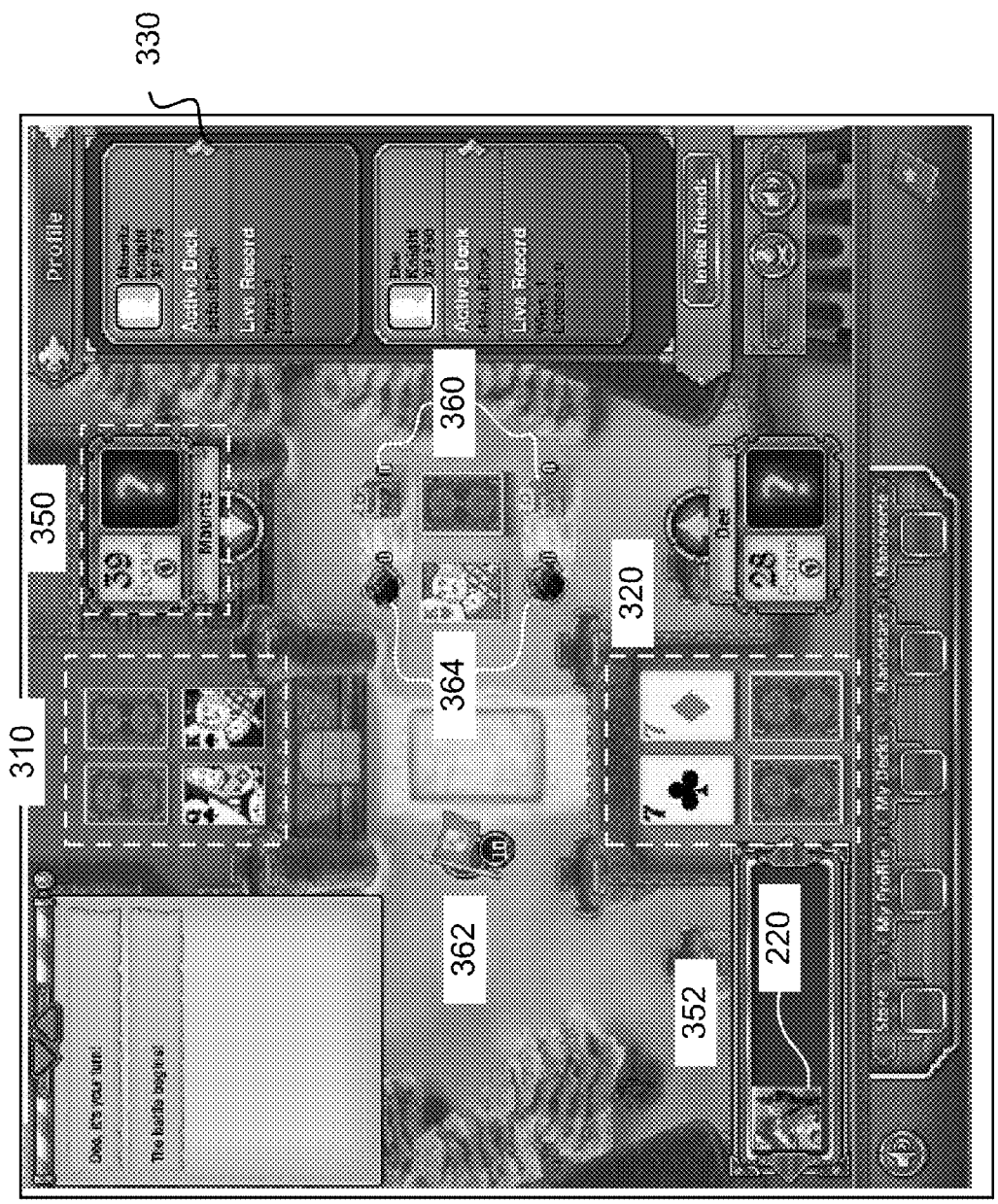
FIG. 3 depicts an exemplary user-side display of a game in accordance with an embodiment of the present invention.

As shown in FIG. 3, an exemplary method may begin with the system "dealing" each player four playing cards 310, 320; two face-up and two face-down. In this example, the object of the game is to modify or replace those four playing cards to have the highest score at the end of the match. A player's score may be calculated by adding up the numbers of each of their playing cards. In embodiments, the system may be programmed such that Jacks are worth 11 points, Queens are 12, Kings are 13, and an Ace is worth 1 point. Other scoring attributes are possible as well.

In order to determine what Nobles a player has access to via, for example, "Active Deck" tab 330 or "My Decks" tab 340, a digital rights management system may be used, for example, by the game server contacting a digital token rights database. Thus, a player may be provided with access to corresponding Nobles, and/or preconfigured decks of Nobles that the player may have stored locally or remotely. In embodiments, a player with no preexisting rights may be granted access to, or provided with, a starter deck including certain, usually low-level, non-standard tokens. For example, a user may be given 20 Nobles to start playing with. In embodiments, users may gain access to additional token by purchasing rights through a digital rights management system. In embodiments, tokens may be bought, rented, traded, and the like. Tokens may be set to expire after a period of time, a number of uses, or other criteria.

In embodiments, a user's non-standard tokens can be used in other games, and can be configured to act, and appear, as a different asset unique to each game. For example, a token 200, as depicted on the left and right side of FIG. 2, may have a generic appearance 210, such as a football player, and a number of game-specific graphical representations 220, 230, as shown below the generic graphic 210. Thus, the token may be depicted in a particular game, such as a real-time strategy game, in a unique manner, as corresponding token elements 230 in FIGS. 5 and 6. The game-specific graphic, e.g. 220, 230, may be advantageously configured as a selectable icon to use the token in the game as well, as in FIG. 5. Embodiments may include allowing and/or requiring the user to select a limited number of Nobles to groups, e.g. functional group 620, 630, 640, from the available Nobles for use in a particular game, e.g. available tokens 610. For example, as shown in FIG. 6 a user may have rights to over 20 Nobles shown in available tokens 610, but a particular game, instantiation, and/or limitation applied to the particular user, may have a hard limit, such as shown by functional groups 620, 630, 640, which each have a maximum of 10 fillable slots. Therefore, the user may select up to 10 Nobles per functional group 620, 630, 640, or other limited number, for play. In other embodiments, the number Nobles available for use in a game may be handicapped depending on factors such as, for example, the respective skill levels of the player.

As shown in FIG. 3, a score meter 350 may be presented on the game screen showing two values. The top number may reflect a total score, and the bottom number may reflect any bonus points or penalties the player has earned. If any playing cards 310 are face-down, and the values unknown to the player viewing the screen, then a score may be estimated in score meter 350 by the computer processor. For example, the programming instructions may specify that when calculating the estimated score, a face-down playing card is considered to be worth 7 points, or the value may be set by the particular user.

During a player's turn, they may, for example, draw Nobles into their hand 352. This may be done for example by clicking on a user interface including a graphical representation, or thumbnail, of the Noble. A selected, or drawn Noble, may be presented in full size in hand 352, representing its readiness for use by the player, e.g. token 220. A player may draw one Noble at the start of each turn from the pulsing Noble Tower 360. A player may also click on the pulsing "Knock Flag" 362, which triggers the end of the game sequence.

If a player wants to use a Noble, they may click on a "Use" button (not shown) when selecting, mousing over or viewing the Noble, e.g. 220, from deck 352 in full size. This command may be transmitted to a processor that is executing the game. As known by those of skill in the art, the processing may be performed, for example, by a host remote from the participating user clients, the mechanics of which are not discussed in detail herein. The Noble may then be shown to move to the center of the screen and a determination may be made by the processor whether the effect described on the Noble occurs or not. In embodiments, a player may play any number of Nobles in a given turn. Once a player is holding more than, for example, four Nobles in hand 352, the system may require them to play or discard Nobles until the player has less than four.

Nobles may affect one target or multiple targets, depending on the effect of the Noble. Targets may be playing cards, Nobles, a player's bonus, Traps, etc. Some Nobles may take effect automatically after playing them, while others may require a user to select targets before the effect occurs. The effects of a Noble may also be restricted to a certain type of playing card, such as, for example, a specific suit or color, certain numbers or face-cards, odd or even numbers, or a combination of multiple types. Some Nobles may also target the opponent's hand of Nobles, Noble Towers 360, Noble Pits 364, and Traps.

Nobles may reflect more generic tokens, e.g. persistent characters with specific traits. Nobles may include a variety of attributes that may be generic, or game specific. For example, Nobles may include Clan, Gender, Trap-proof, and/or rarity attributes. These attributes may be used in various ways such as limiting Nobles' effectiveness against other Nobles, making Nobles resistant to certain actions, such as traps, and the like. The traits of a token may be represented on Noble cards with "Tags". Tags may be used by the system to determine whether a Noble is a legal target of another Noble. For example, a Noble being played might only target an opponent's male Nobles. If the opponent doesn't have any male Nobles, the effect will fail, or will fail with respect to Nobles with the Tag "female".

Noble card categories may include, for example:

| Noble Type | Example 1 | Example 2 |
| --- | --- | --- |
| Plus/minus | +5 to each of two target cards. | −3 to each of opponent's cards. |
| Bonus | +1 Bonus. | +1 Bonus for each Spade in play. |
| Fixed | Turn 1 card into a King. | Turns all opponent's face-up Kings into Fives. |
| Kill Playing Card | Kill all opponent black Jacks. | Kill all opponent cards. |
| Kill Modifier | Kill one opponent trap. Cannot be trapped. | Kill all of an opponent's hand of Nobles that are Things, Tech/Black or Wild/Green. |
| Swap playing card | Give a black card in exchange for one opponent's down card. | Exchange one of your red cards for one opponent black card. |
| Steal Playing Card | Steal an opponent's Queen. Cannot be trapped. | Steal one opponent Club. |
| Steal Modifier | Steal the next Noble in opponent's Noble deck and add it to your hand. | Steal all Females from opponent's Noble hand. |
| Trap | Until the end of the game, blocks any Male or Female Nobles that attack your cards. | For the rest of the game has a 50% chance of blocking attacks by Males and Things. |

Additional descriptions of possible Nobles are described further below.

When targeting is required by a Noble, the system may determine targets meeting the necessary criteria, and the display of all legal targets may be modified, such as by highlighting them with a green border, and the like. If the Noble targets a single playing card, the system may initiate the effect immediately after the user clicks on one card. If a Noble requires multiple targets, the display may be modified to reflect the user clicking on a playing card, such as by changing a highlight to blue. The system may be configured so that clicking the same playing card again deselects it.

In embodiments, potential face-down target playing cards may be displayed differently than face-up cards that are known to be eligible or ineligible targets. For example, face-down cards may have a yellow highlight, indicating that they are potential, but uncertain, targets. These can be selected as targets by the user, but if they don't meet the requirements, the Noble effect will fail. Through similar processes, a player may gain information about what another player's down cards are. In the event that a failed or successful Noble play against a down card results in a logical conclusion regarding, for example, the value or suit of, a down card, the display of the user having access to this information may be modified differently from other users' displays. Likewise, if a player's down card is known to another player, the player owning the down card may have their display modified in a way that tells the owning player that another player has additional information about that card. For example, if an opposing player uses a Noble that automatically changes a down card of player 1, without the new value of the down card being revealed to other players, player 1's display may be changed to include an indicator reflecting that the opposing player knows the value of the down card, even though player 1 may not.

In embodiments, the display may include partial transparency states, for times when a player knows the suit but not the value, or vice versa. As indicated above, this may occur when certain Nobles with predetermined effects, and/or limited applicability are used on face-down playing cards.

In embodiments, the programming instructions may typically provide functions where "plus/minus" Nobles result in modifications to playing cards' values. Similarly, "Bonus" Nobles may provide for separate counts that are summed at the conclusion of a hand. These may include instructions for increasing or decreasing a player's total score by a specific amount, and may be further determined by certain playing cards being in play. "Fixed" Noble may include functions whereby a playing card may be changed in various ways, such as changing the target playing card to a particular value or suit. In embodiments, this can result in a combination of playing cards that are not limited to the combinations present in, for example, a standard 52 card deck. That is, as indicated above, a "Fixed" Noble may turn a playing card into a King, or turn Kings into fives, which may result in more or less Kings and/or fives in play than are typically found in a standard 52 card deck.

"Swap" Nobles may exchange a user's targeted playing card(s) with an opponent's targeted playing card(s), and the like. Whereas, a "Steal" Noble may replace a user's targeted playing card(s) with an opponent's targeted playing card(s), without replacing the opponent's card(s). The system may be configured to replace an opponent's card(s) from the draw pile. "Steal" Nobles may also target an opponent's Nobles in-hand, which do not get replaced. In embodiments, the system may be configured to change possession of "stolen" Nobles temporarily, i.e. during the game, or "permanently", i.e. the digital rights to the token are changed in the database.

Programming instructions may also provide functions where "Kill" Nobles, such as Kill Playing Card and Kill Modifier, can remove playing cards or nobles from a player's hand 352, consideration and/or play. For example, a Kill Playing Card may "Kill" the target playing card(s) and place it on the bottom of the discard pile, or otherwise remove it from play. Kill Modifier may allow a user to designate an opponent's Noble(s) that are in-hand, e.g. hand 352, making them unavailable for the opponent to use, or otherwise removing them from play. In embodiments, the instructions may not allow "killed" Nobles to be replaced. Other targets of Kill Modifiers may include Noble Towers, Noble Pits, and Traps. In embodiments, the systems and methods may be further configured, and/or include automated processes, to change the display to show both players the targeted Noble(s) when Noble(s) are killed and/or stolen, so that both players know what was killed/stolen.

"Trap" Nobles may be configured to take effect subsequent to when they are played. For example, a "Trap" Noble may be responsive to an opposing player's action, waiting to be triggered. In general, the system may be configured to establish rules upon use of the "Trap" to prevent or restrict some future action/use of an opponent. Traps may prevent certain types of Nobles from taking effect when the opponent plays them, and may be configured to be consumed after being triggered once, while others may be configured to last for a predetermined time or number of uses, or the whole game.

Figure 4:
FIG. 4 depicts an exemplary user-side display of a game in accordance with an embodiment of the present invention.

As shown in FIG. 4, embodiments may include calculating one or more user scores by score meters 350, 354 and the like based on attributes of the standard and non-standard tokens, including modified attributes of the tokens, and determining a winner of the game based on the calculated user scores shown in score meters 350, 354. User profiles may be updated in a database to reflect the results of the game, including, for example, modifying in the database a score representing a player's skill and the like. Such scores can then be used later to perform other automated tasks such as matching players by skill, and the like.

In embodiments, a virtual trading card game, such as described herein, may be played on a social networking site. Appropriate software may be downloaded to a client computer and can interact with other client's and/or servers, through the network, e.g. the Internet, to connect with other players who also downloaded the same client program. Embodiments may also include providing a user with the option to send invites to friends, which may include a link for downloading the game. Game instructions may be configured to calculate an effect of a token based on a number of invited friends playing a game, a number of networked friends playing a game, and the like. Embodiments may also include downloading all, or part, of the game to personal computers, mobile phones, and similar devices with sufficient processing power and connectivity.

Figure 5:
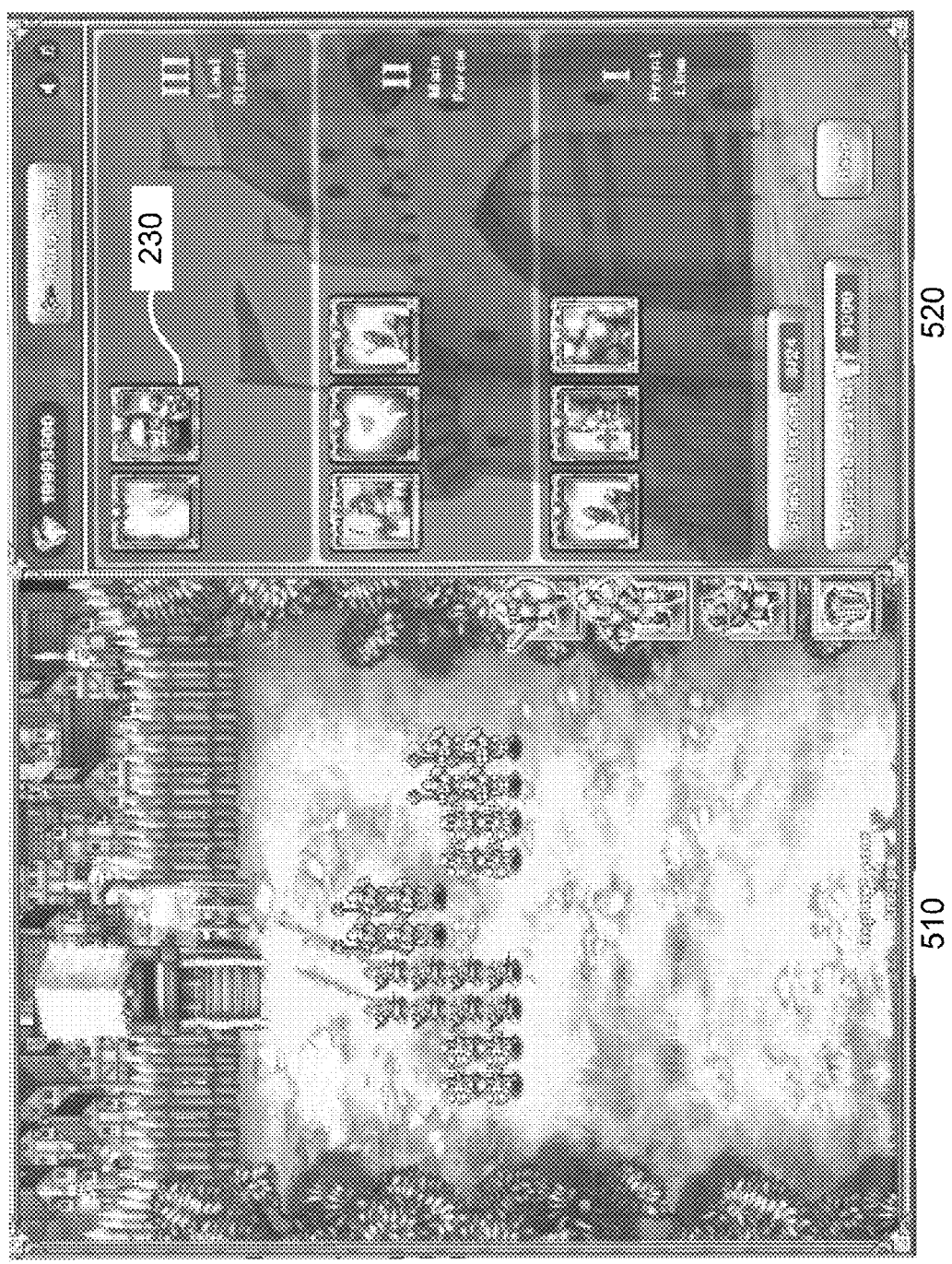
FIG. 5 depicts an exemplary user-side display of a game in accordance with an embodiment of the present invention.

As mentioned above, digital tokens may be used in multiple games with game-specific functions. For example, tokens used in the above-described card game may also be used in another game such as a real-time strategy game with a battlefield portion 510 of the screen and a token-use portion 520 of the screen, as shown in FIG. 5. Gameplay in the battlefield portion 510 of the screen may be influenced by the user's activation of token functions, that result in different functions than those used in the card game for the same generic token.

Embodiments may include various combinations of the following features. Tokens may be disposable in nature with a certain number of uses or a specific pattern of wear. Tokens may get improved attributes and performance as a function of how many of a user's friends on a social network are playing with the user or have been invited by the user. Custom decks for a given game may be the same for opponents or different, e.g. they can be regulated by handicap budgets of how many points of value are allowed, budgets related to other attributes of the tokens, and the like. Decks and gameplay can be organized around a variety of handicapping methods so that social players can level the playing field and compete in tournaments, e.g. handicapping allowable tokens and/or token effects based on competitive rank, the value of a player's total collection of tokens, etc. Additional attributes of tokens may provide expanded features such as including storylines and related events and functions within games, special rules for decks that unlock unique functionality, such as "clan decks" that require a certain percentage, such as 50%, of its members to be from that clan, and that enable inter-clan and intra-clan competitions and tournaments. Token use may also be tracked by a server and rewards, such as additional tokens and/or functionality, provided to the user and/or user's token based on milestones such as total games played, different types of games used in, victories, etc. Complimentary tokens may have display options such as a "FREE" banner, a dull appearance, and the like, that can be changed once the user purchases the token, thereby encouraging the user to purchase the token. A digital token rights management system may include a user exchange allowing the digital rights to tokens to be bought, sold, and/or traded by users via the digital token rights management system and recorded in the rights database.

Games may include instructions for allowing different tokens to be used together for unique combined effects. Thus, for example, using tokens 260 and 270 shown in FIG. 2 together in one game might result in a combination function "X", whereas tokens 260 and 270 may not be combinable in another game, or may result in an altogether different combination function "Z". The complexity of such combinations is advantageously used in the context of automated computer games, without the need for the user to learn all such possibilities to monitor their own play or that of another player. Additionally, having the game run by a computer server allows for "surprise" combinations that the user was unaware of, which is not as feasible in conventional games where each player generally knows the rules, possible combinations, and effects.

Embodiments of the present invention can include systems for implementing the described methods, as well as computer-readable storage medium coded with instructions for causing a computer to execute the described methods. For example, an electronic system including a processor, a memory and an electronic communication device may be configured to control an online game including providing standard and non-standard tokens to the players of the game, as described herein. The system may include a user computer system, wireless communication devices, subnetworks, a server, or any other network-capable device with the requisite functional capabilities.

The system includes any number of processors (not shown) that are coupled to storage devices including a first storage (not shown, typically a random access memory, or "RAM"), second storage (not shown, typically a read only memory, or "ROM"). Both of these storage devices may include any suitable type of the computer-readable media described and/or mentioned above. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The system may also include an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other known input devices, including other computers. The system may be coupled to a computer or other electronic communication network using a network connection. The network can connect various wired, optical, electronic and other known networks to exchange information among computers, servers, wireless communication devices, and sub-networks. With such a network connection, it is contemplated that the system and the processor therein may receive information from the network, or may output information to the network in the course of performing the above-described method steps. The above-described devices and materials will be familiar to those of skill in the computer hardware and software arts and need not be individually or exhaustively depicted to be understood by those of skill in the art. The hardware elements described above may be configured to act as one or more modules for performing the operations described above.

In addition, embodiments of the present invention further include computer-readable storage media that include program instructions for performing various computer-implemented operations. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The following tables show additional details of exemplary digital tokens labeled according to "Nano Name".

TABLE 1

| Nano Name | Noble Name | Nano ID | Noble Type | Description | Race | Tag | Rarity (From Fed) |
|---|---|---|---|---|---|---|---|
| HeHateMe | War of the Roses | 1 | Swap playing card | Swap any 2 of your Spades with any 2 opponent cards. | Yellow | Male | R |
| Edison | Magnetism | 2 | Steal Modifier | Steal top Noble from opponent Noble discard pile. Cannot be trapped. | Yellow | Male | R |
| MoneyHoney | Treasure | 3 | Bonus | +1 Bonus for each Spade in play. | Yellow | Female | R |
| Nanny | Blackmail | 4 | Fixed | Turn one King into a Jack of Spades. | Yellow | Female | C |
| Toaster | Murder Hole | 5 | Plus/Minus | −5 to one face-up card. | Yellow | Male | C |
| King Bling | Golden Apple | 6 | Bonus | +1 Bonus. | Yellow | Male | C |
| Mischief | Stepmother | 7 | Swap playing card | Swap one of your cards for an opponent's Spade. | Yellow | Female | C |
| DesperateSoccerMom | Six in the City | 8 | Fixed | Turn opponent's face-down cards into Sixes. | Yellow | Female | U |
| Napolean | Slege | 9 | Plus/Minus | −3 to each of opponent's cards. | Yellow | Male | R |
| Paris | Lingerie | 10 | Trap | Trap: Until the end of the game, blocks any Male or Female Nobles that attack your cards. | Yellow | Female | R |
| Doctor | Surgery | 11 | Plus/Minus | +5 to each of two target cards. | Yellow | Female | U |
| Blondie | Makeover | 12 | Fixed | Turn all your Spades into Queens. | Yellow | Female | U |
| YouAreSoFired | Guillotine | 13 | Kill playing card | Kill all opponent face-down Kings. | Yellow | Male | C |
| Jennifer | Jealousy | 14 | Fixed | Turn each opponent Jack into a 3. | Yellow | Female | U |
| NotDeadYet | (Coming Soon) | 15 | Plus/Minus | Can not be trapped. (Coming Soon) | White | Male | R |
| Justin | Romance | 16 | Steal Playing Card | Steal an opponent's Queen. Cannot be trapped. | White | Male | U |

TABLE 1-continued

| Nano Name | Noble Name | Nano ID | Noble Type | Description | Race | Tag | Rarity (From Fed) |
|---|---|---|---|---|---|---|---|
| Detroit | Factory | 17 | Fixed | Turns all cards into Spades. Cannot be trapped. | Yellow | Male | U |

TABLE 2

| Nano Name | Noble Name | Nano ID | Noble Type | Description | Race | Tag | Rarity (From Fed) |
|---|---|---|---|---|---|---|---|
| Aspirin | Antidote | 18 | Plus/Minus | +2 to each of your Spades. | Yellow | Female | C |
| Nonpology | Six Scandel | 19 | Fixed | Turns every opponent red King into a Six. Cannot be trapped. | Yellow | Male | U |
| Sherlock | Golden Key | 20 | Kill Mod | Kill one opponent trap that is City/Yellow or Elemental/Blue. Cannot be trapped. | Yellow | Male | C |
| Brad | Jackdom | 21 | Fixed | All your cards become Jacks. | Yellow | Male | R |
| Frankenstein | Monster | 22 | Steal Modifier | Steal all Females from opponent's Noble hand. | Yellow | Male | U |
| FreeShipping | (Coming Soon) | 23 | Plus/Minus | (Coming Soon) Cannot be trapped. | Yellow | Male | R |
| MinuteMan | (Coming Soon) | 24 | Plus/Minus | (Coming Soon) Cannot be trapped. | Yellow | Male | R |
| NoYouDon't | Drawbridge | 25 | Trap | Trap: For the rest of the game has a 50% chance of blocking attacks by Males and Things. | Yellow | Female | U |
| Aladdin | Magic Lamp | 26 | Fixed | Choose any 3 cards. Those that are red turn into Kings. | White | Male | R |
| VooDoo | Hex | 27 | Fixed | Turn all face-up opponent black cards into Aces. Cannot be trapped. | White | Male | U |
| Jim | Cult | 28 | Kill playing card | Kill all your own cards. | White | Male | C |
| Mick | Apprentice | 29 | Fixed | Turn your face-up cards into Tens. | White | Male | C |
| Phantom | Masked Ball | 30 | Trap | Trap: Blocks and captures one Female Noble. | White | Male | U |
| Venus | Holy Hand Grenade | 31 | Kill Mod | Kill one opponent trap. Cannot be trapped. | White | Female | U |
| IMHD | Henry | 32 | Kill playing card | Kills all opponent Queens. | White | Male | R |
| GoodLuckWithThat | Wet Blanket | 33 | Trap | Trap: 50% chance to block the next opponent Noble played. | White | Female | C |

TABLE 3

| Nano Name | Noble Name | Nano ID | Noble Type | Description | Race | Tag | Rarity (From Fed) |
|---|---|---|---|---|---|---|---|
| Godiva | Bareback | 34 | Fixed | Turn one red card into a Queen. | White | Female | U |
| Joan of Arc | Bewitched | 35 | Kill playing card | Kill an opponent black card and replace from one top of the discard pile. | White | Female | U |
| Elentel | Elven Magic | 36 | Bonus | +1 Bonus for each of your Hearts. Cannot be trapped. | White | Female | R |
| Lady of the Lake | Offering | 37 | Fixed | Turn one Heart into a King. | White | Female | U |
| Zornbie | Resurrection | 38 | Steal Modifier | Recover a used Noble from the top of your Noble discard pile. | White | Thing | R |
| Cinderella | Fairy Godmother | 39 | Fixed | Turn all your Hearts into Queens. Cannot be trapped. | White | Female | R |
| Merlin | Magic Shield | 40 | Trap | Trap: Until the end of the game, block any Nobles attacking your cards. | White | Male | R |
| Excalibur | Crusader | 41 | Fixed | Turn 1 card into a King. | White | Male | U |
| Cupid | Arrow Silt | 42 | Fixed | Turn your face up cards into Hearts. | White | Male | C |
| Pedro | Acolyte | 43 | Fixed | Turn all cards into Hearts. | White | Male | U |
| Wiz | Wizardry | 44 | Kill Mod | Kill all opponent traps. Cannot be trapped. | White | Male | R |
| Yogi | Hypnosis | 45 | Swap playing card | Give a black card in exchange for one opponent's down card. | White | Male | C |
| Santa | Gifts | 46 | Bonus | +1 Bonus for each Heart in play. Cannot be trapped. | White | Male | R |
| ICameInPeace | Call It a Drew | 47 | Kill playing card | Kill all opponent cards. | Black | Thing | R |
| Mother-in-Law | Witch | 48 | Fixed | Turns all opponent's face-up Kings into Fives. | White | Female | U |

TABLE 3-continued

| Nano Name | Noble Name | Nano ID | Noble Type | Description | Race | Tag | Rarity (From Fed) |
|---|---|---|---|---|---|---|---|
| Finn | Scout | 49 | Steal Modifier | Steal all Elemental/Blue Nobles from an opponent's hand. Cannot be trapped. | White | Male | U |

TABLE 4

| Nano Name | Noble Name | Nano ID | Noble Type | Description | Race | Tag | Rarity (From Fed) |
|---|---|---|---|---|---|---|---|
| MTFBWU | Hero | 50 | Steal Modifier | Steal all Tech/Black or Spirit/White Nobles from an opponent's hand. | Black | Male | R |
| B6 | Secret Agent Man | 51 | Trap | Trap: Blocks and captures one City/Yellow, or Wild/Green Noble played by opponent. Cannot be trapped. | Black | Male | R |
| Mega Fax | Bombshell | 52 | Trap | Trap: 50% chance to block each of the next two Nobles played by an opponent. | Black | Female | R |
| C1A | Waterboarding | 53 | Trap | Trap: Blocks and captures one Noble that is either Spirit/White of Elemental/Blue. | Black | Male | U |
| BumbleBeetle | Plate Armar | 54 | Trap | Trap: For the rest of the game, block any attacking Nobles that are Things. Cannot be trapped. | Black | Thing | C |
| RC | Remote Control | 55 | Steal Modifier | Capture one opponent trap. | Black | Female | R |
| Foobar | Iron Mask | 56 | Kill playing card | Kill all opponent black jacks. | Black | Thing | C |
| Spam | Tavern | 57 | Swap playing card | Exchange one of your odd cards for one of your opponent's even cards. | Black | Thing | U |
| Wally | Nice Guy | 58 | Fixed | Turn an 8 into a Queen. Cannot be trapped. | Black | Male | C |
| Crash | Blackout | 59 | Kill Mod | Kill all Tech/Black, City/Yellow or Female Nobles in an opponent's hand. Cannot be trapped. | Black | Thing | U |
| Cookie | Morsel | 60 | Plus/Minus | +2 to each of your cards that are Diamonds. | Black | Thing | C |
| Octomom | Crazy Eights | 61 | Fixed | All cards become Eights. | Yellow | Female | U |
| Black Knight | Run Away | 62 | Kill playing card | All red cards are killed. | Black | Male | U |
| Governator | Barbarian | 63 | Fixed | Turn 2 target cards into Twos. | Black | Male | R |

TABLE 5

| Nano Name | Noble Name | Nano ID | Noble Type | Description | Race | Tag | Rarity (From Fed) |
|---|---|---|---|---|---|---|---|
| AYBABTU | UFO | 64 | Fixed | Turn all opponent red face-down cards into Fives. Cannot be trapped. | Black | Thing | C |
| ASL | Weird Science | 65 | Fixed | Turn an even card into a Queen. | Black | Female | U |
| Jerry | Frog Prince | 66 | Fixed | Turn any 2 black cards into Kings. | Black | Male | R |
| WTH | Purse | 67 | Bonus | +1 Bonus for each of your black cards. Cannot be trapped. | Black | Female | R |
| Cray-Z | Bard | 68 | Kill playing card | Kill target opponent black card. | Black | Thing | C |
| LOL | Minstrel | 69 | Swap playing card | Exchange one of your red cards for one opponent black card. | Black | Female | U |
| Lord Brutish | Chivalry | 70 | Fixed | Turn a Two into a Jack. | Black | Male | C |
| ADD | Tweet | 71 | Plus/Minus | +1 to one card. | Black | Thing | C |
| FAQ | Falcon | 72 | Fixed | Peek at an opponent's face-down cards. | Black | Female | C |
| Karnikaze Robot | Assassination | 73 | Kill Mod | Kill all Tech/Black Nobles from an opponent's hand. | Black | Thing | C |
| Testa | Jackrabbit | 74 | Fixed | Turn two black cards into Jacks. | Black | Male | U |
| OMG | Gold | 75 | Bonus | +2 Bonus for each of your even cards. | Black | Female | R |
| KFP | Roosted Guinea Pig | 76 | Kill playing card | Kill all opponent cards that are not Clubs. | Green | Female | R |
| Skunk | Stinkbomb | 77 | Plus/Minus | −4 to all face-up opponent cards. Cannot be trapped. | Green | Female | R |
| Scarlett | Fountain of Youth | 78 | Plus/Minus | +4 to one card. | Green | Female | C |
| Savege | Beating | 79 | Bonus | −1 Bonus to an opponent for each Club in play. Cannot be trapped. | White | Male | R |

TABLE 5-continued

| Nano Name | Noble Name | Nano ID | Noble Type | Description | Race | Tag | Rarity (From Fed) |
|---|---|---|---|---|---|---|---|
| Pa-Kow | Bludgeon | 80 | Plus/Minus | −3 to one card. | Green | Male | C |
| Bottom Feeder | Mag | 81 | Kill playing card | Replace 1 of your cards with the bottom card of the discard pile. | Green | Female | C |
| Cougar | Clubbing | 82 | Bonus | +1 Bonus for each of your Clubs. | Green | Female | U |

TABLE 6

| Nano Name | Noble Name | Nano ID | Noble Type | Description | Race | Tag | Rarity (From Fed) |
|---|---|---|---|---|---|---|---|
| Scorpiori | Backstab | 83 | Kill Mod | Kill all opponent Nobles thet are Female, City/Yellow, or Elemental/Blue. | Green | Female | U |
| JK | Trojon Morse | 84 | Kill playing card | Kill all opponent face-down Royalty, Cannot be trapped. | Green | Male | R |
| Shizzledog | Pit Ball | 85 | Steal Playing Card | Steel one opponent Club. | Green | Male | C |
| Orc | Invader | 86 | Bonus | −1 Bonus to opponent for each of their cards that is not a Club. | White | Male | U |
| JumpTheShark | Gallows | 87 | Trap | Trap: Stocks one Wild/Green Noble. Cannot be trapped. | Green | Thing | C |
| Crazy Penguin | Catapult | 88 | Kill Mod | Kill all of an opponent's hand of Nobles that are Things, Tech/Black of Wild/Green. Cannot be trapped. | Green | Male | U |
| Macbeth | Tragedy | 89 | Kill playing card | Kill all face-up Royalty. | Green | Male | U |
| Gizelle | Beauty | 90 | Trap | Trap: Stocks and captures the next Male Noble played by an opponent. | Green | Female | R |
| Predator | Hunting | 91 | Steal Modifier | Capture one opponent trap if it is City/Yellow. | Green | Male | C |
| Vlad | Executioner | 92 | Kill playing card | Kill any 3 cards. | Green | Male | R |
| Pocationtas | Forest | 93 | Fixed | Turn any 2 cards into Clubs. | Green | Female | C |
| Peell Mell | Raid | 94 | Kill Mod | Kill one oppopnent trap that is Wild/Green, Spirit/White, or Tech/Black. Cannot be trapped. | Green | Male | U |
| KTMXBI | Flogging | 95 | Kill playing card | Kill all your own cards that are not Clubs. | Green | Female | C |
| Robin Hood | Foreign Trade | 96 | Swap playing card | Swap one of your cards with one opponent face-up card. | Green | Male | R |
| Hysteria | Anthrax | 97 | Kill playing card | Kill opponent's face-down cards. Cannot be trapped. | Green | Female | R |

TABLE 7

| Nano Name | Noble Name | Nano ID | Noble Type | Description | Race | Tag | Rarity (From Fed) |
|---|---|---|---|---|---|---|---|
| ManRam | Beast | 98 | Fixed | Turn your face-down cards into Queens. | Green | Male | U |
| Ogre | Bad Breath | 99 | Fixed | Turn one opponent King into a Two. | Green | Male | U |
| Spartacus | Dagger | 100 | Plus/Minus | −2 to target face-up card. | Green | Male | C |
| Booty | Wench | 101 | Fixed | Turn your Clubs into Tens. | Green | Female | C |
| MindTheGep | Moat | 102 | Trap | Trap: For the rest of the game, blocks 80% of ground attacks (attacks that are not flying or airborne). Cannot be trapped. | Green | Thing | U |
| Diamond | Jewelry | 103 | Trap | Trap: For the rest of the game, blocks any Female Nobles played by opponent. Cannot be trapped. | Blue | Female | U |
| Shotokeki | Shortcake | 104 | Trap | Trap: Blocks 1 Spirit/White, City/Yellow, or Elemental/Blue Noble and puts it on the top of its original deck. Cannot be trapped. | Blue | Thing | C |
| Death | Kiki | 105 | Kill playing card | Kill 2 cards. | Blue | Female | U |
| Dealer | Laboratory | 106 | Fixed | Turn any 2 cards into Diamonds. Cannot be trapped. | Blue | Male | U |
| LowCarb | Meat Pie | 107 | Plus/Minus | −1 to one card. | Blue | Female | C |
| Nurse | Heating Water | 108 | Plus/Minus | +3 to one card | Blue | Female | C |
| Java | Instant Coffee | 109 | Fixed | Turn your black cards into Diamonds. | Blue | Thing | U |

TABLE 7-continued

| Nano Name | Noble Name | Nano ID | Noble Type | Description | Race | Tag | Rarity (From Fed) |
|---|---|---|---|---|---|---|---|
| Szachwan | Explosives | 110 | Kill playing card | Kill all Spades. | Blue | Thing | C |
| IDioNotinhale | Smoke | 111 | Plus/Minus | −5 to an opponent's odd cards. | Blue | Male | R |
| Virus | Infection | 112 | Kill Mod | Kill one opponent Male Trap. Cannot be trapped. | Blue | Female | C |

TABLE 8

| Nano Name | Noble Name | Nano ID | Noble Type | Description | Race | Tag | Rarity (From Fed) |
|---|---|---|---|---|---|---|---|
| Frosty | Blizzard | 113 | Kill playing card | Kill all of opponent's face-up Royalty. | White | Thing | U |
| Seace | Grog | 114 | Trap | Trap: 70% chance to black the next two Male Nobles played by an opponent. Cannot be trapped. | Blue | Thing | U |
| YoHo | Pirate | 115 | Steal Modifier | Steal the next Noble in opponent's Noble deck and add it to your hand. | Blue | Male | U |
| ThatsWhatShe Said | Ladies in Waiting | 116 | Fixed | Turn all your Diamonds into Queens. Cannot be trapped. | Blue | Male | U |
| BoomGoesThe Dynamite | Incoming | 117 | Plus/Minus | −3 to each opponent card that is not a Diamond. Cannot be trapped. | Blue | Thing | R |
| Rushmore | Legacy | 118 | Fixed | Select any 4 cards. If they all are Red, they burn into Kings. Cannot be trapped. | Blue | Male | R |
| Axle | Arsonist | 119 | Plus/Minus | −4 to all opponent face-up cards that are not Diamonds. | Blue | Male | R |
| Taxman | Shakedown | 120 | Plus/Minus | −2 to all opponent cards. Cannot be trapped. | Blue | Male | R |
| Wasabi | Fire | 121 | Trap | Trap: 50% chance to block and capture the next Noble played by an opponent. One time use only. Cannot be trapped. | Blue | Thing | U |
| Goodybag | Tiara | 122 | Bonus | +1 Bonus for each of the Diamonds in play. | Blue | Female | R |
| Dope | Intrigae | 123 | Swap playing card | Exchange 1 of your odd cards for an opponent Royalty. | Blue | Male | U |
| Dark | Vaid | 124 | Fixed | Turn all your cards face-down. Cannot be trapped. | Blue | Thing | C |
| The Don | Hitman | 125 | Kill playing card | Kill any 2 opponent cards. Cannot be trapped. | Blue | Male | R |
| The Cleaner | Steamy | 126 | Fixed | Turn all of your red cards into Kings. | Blue | Male | R |
| FUD | Lite | 127 | Fixed | Turn all cards face-up. Cannot be trapped. | Blue | Thing | C |

TABLE 9

| Nano Name | Noble Name | Nano ID | Noble Type | Description | Race | Tag | Rarity (From Fed) |
|---|---|---|---|---|---|---|---|
| Hammer | Blacksmith | 128 | Fixed | Turn all your face down cards into Diamonds. | Blue | Male | C |
| Loviatar | Disease | 129 | Kill playing card | Kill all Clubs. | Blue | Female | C |
| Rock | Coup | 130 | Kill playing card | Choose 3 opponent cards; any that are Jacks are killed. Cannot be trapped. | Blue | Male | U |
| JunkInTheTrunk | Fortfications | 131 | Trap | Trap: For the rest of the game, blocks 50% of attacks. Cannot be trapped. | Blue | Female | U |
| ROTFL | Architect | 132 | Fixed | Turn all your Aces, Twos, and Threes into Kings. | Black | Female | U |
| Africa | Forces | 133 | Fixed | Reveal an opponent's face-down cards and make each one into an Ace of Diamonds. | Blue | Thing | R |
| Reach | Espionage | 134 | Fixed | Peek at an opponent's face-down cards and make them Spades. Cannot be trapped. | Yellow | Male | C |
| OCD | Distraction | 135 | Kill Mod | Kill all Elemental/Blue or Spirit/White Nobles in an opponent's hand. | Black | Male | C |
| NerdBurger | Brotherhood | 136 | Bonus | +2 Bonus for each of your cards that are 8 or less. | Black | Male | R |

TABLE 9-continued

| Nano Name | Noble Name | Nano ID | Noble Type | Description | Race | Tag | Rarity (From Fed) |
|---|---|---|---|---|---|---|---|
| Jolt | Fire Power | 137 | Plus/Minus | +8 to target Ace, Two, Three or Four. Cannot be trapped. | Black | Thing | U |
| Pamela | Bikini | 138 | Trap | Trap: Until the end of the game, 90% chance to block each Male Noble. | Yellow | Female | R |
| Blackbeard | Pillage | 139 | Steal Playing Card | Steal a Diamond from your opponent. | Yellow | Male | C |
| Posh | Penthouse | 140 | Swap playing card | Choose up to 2 opponent cards that are Jacks or Kings to trade with any 2 of your cards. | Yellow | Female | R |
| Watson | Confession | 141 | Fixed | Reveal opponent's face down cards. | Yellow | Male | C |
| WOOtl | Rags to Riches | 142 | Fixed | Select 3 cards. Any that are Clubs will turn into Kings. Cannot be trapped. | Green | Male | R |

TABLE 10

| Nano Name | Noble Name | Nano ID | Noble Type | Description | Race | Tag | Rarity (From Fed) |
|---|---|---|---|---|---|---|---|
| Hercules | Brute Force | 143 | Bonus | −3 to an opponent's Bonus. Cannot be trapped. | Green | Male | R |
| Amoeba | Plunder | 144 | Steal Modifier | Steal all Wild/Green Nobles from opponent hand. Cannot be trapped. | Green | Thing | U |
| Priestess | Hail Mary | 145 | Fixed | Peek at an opponent's face-down cards and make them Hearts. | White | Female | C |
| Gruage | Pled Piper | 146 | Steal Playing Card | Steal one Heart from your opponent. | White | Male | C |
| Hater | Hack | 147 | Steal Modifier | Steal all Spirit/White Nobles from an opponent's hand. Cannot be trapped. | Black | Male | U |
| Catholic School Girl | Exorcism | 148 | Kill Mod | Kill all Nobles in opponent's hand except for Elemental/Blue ones. | White | Female | R |
| Puck | Trickster | 149 | Fixed | Turn any card into a 9. | White | Male | C |
| Karma | Good Vibrations | 150 | Plus/Minus | +1 to each of your Hearts. | White | Female | C |
| Kung Fu | Pandemonium | 151 | Kill playing card | Kill any playing card. | White | Male | C |

The invention has been described with reference to exemplary embodiments. Modifications and alterations of the described embodiments may be evident to those of ordinary skill in the art upon a reading and understanding of this specification. The present invention is intended to include all such modifications and alterations insofar as they come within the scope of the appended claims, or the equivalents thereof.

What is claimed is:

1. A method of providing computer-implemented games including a first and a second online games, the method being implemented in a physical processor configured by machine-readable instructions to execute computer programs, the method comprising:
  providing a first user with at least one standard token in a first set of tokens, the first set of tokens being shared and identical between a plurality of users playing a first online game;
  verifying, by a computer processor, the first user has rights to non-standard tokens in a second set of tokens;
  receiving over an electronic network a first instruction from a client computer associated with the first user to use at least one non-standard token during the first online game;
  based on the first instruction, executing, by a computer processor, a second instruction that modifies, based on the at least one non-standard token an attribute of at least one of the standard tokens provided to one of the plurality of users playing the first online game; and
  causing the client computer associated with the first user to display the modification of the attribute of the at least one of the standard tokens; and,
  wherein the first set of tokens consists of, at least initially, a pool of possible tokens corresponding to individual cards of a standard 52 card deck, and wherein one or more of the non-standard tokens can be used by the first user in a second online game for impacting an outcome of the second game, the second online game being separate and independent from the first online game.

2. The method of claim 1, wherein the second instruction modifies an attribute of a standard token provided to one of the plurality of users, the modified attribute including a numerical value associated with a card of a standard 52 card deck.

3. The method of claim 1, wherein the second instruction modifies an attribute of a standard token provided to one of the plurality of users, the modified attribute including a suit of a card of a standard 52 card deck.

4. The method of claim 1, further comprising:
  causing the client computer associated with the first user to display at least a first provided standard token in an up configuration that allows the first user to view a suit and a value of the first provided standard token and to display at least a second provided standard token in a down configuration that prevents the user from viewing a suit and a value of the second provided standard token; and
  based on a use of at least one of the non-standard tokens provided to one of the plurality of users playing the first game, changing the first display to include an additional indicator indicating that one of the plurality of users playing the first game, other than the user, can view at least one of the suit and the value of the second provided standard token in the down configuration.

5. The method of claim 1, wherein the computer-implemented game is provided in coordination with a social networking site, and the rights of the user to the non-standard tokens are verified based on a user account associated with the social networking site.

6. The method of claim 1, wherein the second online game includes at least a different presentation and a different set of rules from the first online game, and the at least one non-standard token is assigned different effects in the first and second online games.

7. A method of providing computer-implemented games including a first and a second online games, the method being implemented in a physical processor configured by machine-readable instructions to execute computer programs, the method comprising:
providing a first user with at least one standard token in a first set of tokens, the first set of tokens being shared and identical between a plurality of users playing the first online game;
verifying, by a computer processor, rights of the first user has rights to non-standard tokens in a second set of tokens;
receiving over an electronic network a first instruction from a client computer associated with the first user to use at least one non-standard token during the first online game;
based on the first instruction, executing by a computer processor a second instruction that changes possession of a standard token among the plurality of users playing the first online game, changes possession of a non-standard token among the plurality of users playing the first online game, removes a standard token from play in the first game, removes a non-standard token from play in the first game, adds a bonus score to the user, deducts a score from one of the plurality of users playing the first game, prevents the use of a non-standard token, changes a suit of a standard token provided to one of the plurality of users playing the first online game, and/or changes a value of a standard token provided to one of the plurality of users playing the first online game; and
causing the client computer associated with the first user to display a result of the execution of the second instruction; and,
wherein the first set of tokens consists of, at least initially, a pool of possible tokens corresponding to each card of a standard 52 card deck, and wherein one or more of the non-standard tokens can be used by the first user in a second online game for impacting an outcome of the second online game, the second online game being separate and independent from the first online game.

8. The method of claim 7, wherein the second instruction changes a numerical value associated with a card of a standard 52 card deck.

9. The method of claim 7, wherein the second instruction changes a suit of a card of a standard 52 card deck.

10. The method of claim 7, further comprising:
causing the client computer associated with the first user to display at least a first provided standard token in an up configuration that allows the first user to view a suit and a value of the first provided standard token and to display at least a second provided standard token in a down configuration that prevents the user from viewing a suit and a value of the second provided standard token; and
based on a use of at least one of the non-standard tokens provided to one of the plurality of users playing the first game, changing the first display to include an additional indicator indicating that one of the plurality of users playing the first game, other than the user, can view at least one of the suit and the value of the second provided standard token in the down configuration.

11. The method of claim 7, wherein the second online game includes at least a different presentation and a different set of rules from the first online game, and the at least one non-standard token is assigned different effects in the first and second online games.

12. A non-transitory computer-readable storage medium including instructions for causing a computer to perform a method of providing computer-implemented games including a first and a second online games, the method being implemented in a physical processor configured by machine-readable instructions to execute computer programs, the method comprising:
providing a first user with at least one standard token in a first set of tokens, the first set of tokens being shared and identical between a plurality of users playing a first online game;
verifying, by a computer processor, the first user has rights to non-standard tokens in a second set of tokens;
receiving over an electronic network a first instruction from a client computer associated with the first user to use at least one non-standard token during the first online game;
based on the first instruction, executing, by a computer processor, a second instruction that modifies, based on the at least one non-standard token an attribute of at least one of the standard tokens provided to one of the plurality of users playing the first online game; and
causing the client computer associated with the first user to display the modification of the attribute of the at least one of the standard tokens; and,
wherein the first set of tokens consists of, at least initially, a pool of possible tokens corresponding to individual cards of a standard 52 card deck, and wherein one or more of the non-standard tokens can be used by the first user in a second online game for impacting an outcome of the second game, the second online game being separate and independent from the first online game.

13. A method of providing an online game comprising:
executing an instance of a first online game for a plurality of users, the instance of the first online game including:
a first set of tokens including first tokens, the first set of tokens being shared and identical between the plurality of users; and
a plurality of second sets of tokens, a given set of the plurality of second sets of tokens including second tokens that are associated with a respective one of the plurality of users;
assigning at least one of the first tokens to the individual ones of the plurality of users, respectively;
receiving from one of the plurality of users an instruction indicating the use of at least one of the second tokens associated with the one of the plurality of users;
implementing by a computer processor a first rule in the instance of first online game based on the use of the at least one of the second tokens, the first rule including, modifying, based on the at least one of the second tokens, an attribute of the at least one of the first tokens assigned to one of the plurality of users;

calculating a user score based on the modified attribute of the at least one of the first tokens;

determining a winner of the first online game based on the calculated user score; and causing the client computer associated with the first user to display the winner of the first online game; and, wherein one or more of the second tokens can be used by the user in a second online game for impacting an outcome of the second game, the second online game being separate and independent from the first online game.

14. The method of claim 13, further comprising:

during the presentation of the first online game, providing instructions for displaying, in a first state, a particular one of the first tokens assigned to the one of the plurality of users; and after the receiving the instruction indicating the use of the at least one of the second tokens, providing instructions for displaying, in a second state, the particular one of the first tokens, wherein, the second state includes a visual indicator, not present in the first state, based on a logical rule including an applicability of the at least one of the second tokens and the attribute of the particular one of the first tokens.

15. The method of claim 13, wherein the second online game includes at least a different presentation and a different set of rules from the first online game, and the at least one second token is assigned different effects in the first and second online games.

16. A method of providing an online game games including a first and a second online games, the method being implemented in a physical processor configured by machine-readable instructions to execute computer programs, the method comprising:

providing rights to a digital token to a first user based on a request from the first user;

beginning a first online gaming session with the first user, the first online gaming session including a presentation of a first online game in which the first user may select use of the digital token;

implementing by a computer processor a first rule in the first online game based on a selected use of the digital token by the first user in the first online game, wherein the implementation of the first rule produces a first effect impacting an outcome of the first online game;

beginning a second online gaming session with the first user, the second online gaming session including a presentation of a second online game in which the first user may select use of the digital token, wherein the second online game includes at least a different presentation and a different set of rules from the first online game; and implementing by a computer processor a second rule in the second online game based on a selected use of the digital token by the first user in the second online game, wherein the implementation of the second rule produces a second effect impacting an outcome of the second online game, wherein the second online game includes at least a different presentation and a different set of rules from the first online game, and the first effect is separate and distinct from the second effect.

17. The method of claim 16, wherein:

the first online game includes presenting the first user with a display including cards from a standard 52 card deck assigned to individual users playing the first online game;

the first rule in the first online game includes modifying, based on the digital token, an attribute of at least one of the cards assigned to the users playing the first online game.

18. The method of claim 17, further comprising:

causing the client computer associated with the first user to display at least a first provided card is displayed in an up configuration that allows the user to view a suit and a value of the card and at least a second card is displayed in a down configuration that prevents the user from viewing a suit and a value of the second card; and based on a use of a digital token provided to one of a plurality of users playing the first online game, changing the first display to include an additional indicator indicating that one of the plurality of users playing the first online game, other than the user, can view at least one of the suit and the value of the second card in the down configuration.

19. The method of claim 17, wherein the modifying includes changing a numerical value associated with a card of a standard 52 card deck.

20. The method of claim 17, wherein the modifying includes changing a suit of a card of a standard 52 card deck.

21. The method of claim 16, wherein the online game is provided in coordination with a social networking site, and the rights to the digital token are provided based on a user account associated with the social networking site.

* * * * *